US008382205B2

(12) United States Patent
Teer

(10) Patent No.: US 8,382,205 B2

(45) Date of Patent: Feb. 26, 2013

(54) ADJUSTABLE DEVICE FOR MOTOR VEHICLE SEAT

(75) Inventor: Antal Teer, Millbrook, AL (US)

(73) Assignee: C. Rob Hammerstein GmbH & Co. KG, Solingen (DE)

(*) Notice: Subject to any disclaimer, the term of this patent is extended or adjusted under 35 U.S.C. 154(b) by 146 days.

(21) Appl. No.: 12/965,726

(22) Filed: Dec. 10, 2010

(65) Prior Publication Data

US 2012/0146379 A1 Jun. 14, 2012

(51) Int. Cl.
*B60N 2/16* (2006.01)
*B60N 2/18* (2006.01)

(52) U.S. Cl. .................................................. 297/344.17

(58) Field of Classification Search .............. 297/344.17
See application file for complete search history.

(56) References Cited

U.S. PATENT DOCUMENTS

| | | | | |
|---|---|---|---|---|
| 3,617,021 | A | 11/1971 | Littmann | |
| 4,802,374 | A | 2/1989 | Hamelin | |
| 5,421,640 | A | 6/1995 | Bauer | |
| 6,073,893 | A | 6/2000 | Koga | |
| 6,260,672 | B1 * | 7/2001 | Frohnhaus et al. | 297/344.17 X |
| 6,260,922 | B1 | 7/2001 | Frohnhaus | |
| 6,309,020 | B1 * | 10/2001 | Niikura et al. | 297/344.17 X |
| 6,322,146 | B1 | 11/2001 | Fisher | |
| 6,347,778 | B1 * | 2/2002 | Koga et al. | 297/344.17 X |
| 6,352,006 | B1 * | 3/2002 | Kurashita | 297/344.17 X |
| 6,490,942 | B1 * | 12/2002 | Meyer | 297/344.17 X |
| 6,517,157 | B1 * | 2/2003 | Vorac | 297/344.17 X |
| 6,578,920 | B2 * | 6/2003 | Delmas et al. | 297/344.17 |
| 7,051,986 | B1 | 5/2006 | Taubmann | |
| 7,143,513 | B2 | 12/2006 | Taubmann | |
| 7,340,974 | B2 * | 3/2008 | Landskron et al. | 74/425 |
| 7,437,962 | B2 | 10/2008 | Taubmann | |
| 7,458,294 | B2 | 12/2008 | Dohles | |
| 7,641,164 | B2 * | 1/2010 | Nakamura | 297/344.17 X |
| 7,775,592 | B2 * | 8/2010 | Becker et al. | 297/344.17 |
| 7,780,235 | B2 * | 8/2010 | Teufel et al. | 297/344.17 X |
| 8,172,326 | B2 * | 5/2012 | Adragna et al. | 297/344.17 |
| 2006/0170266 | A1 * | 8/2006 | Landskron et al. | 297/344.11 |
| 2009/0230752 | A1 * | 9/2009 | Adragna et al. | 297/463.1 |
| 2010/0242168 | A1 * | 9/2010 | Corcoran | 4/667 |
| 2011/0084525 | A1 * | 4/2011 | Endo et al. | 297/217.2 |

FOREIGN PATENT DOCUMENTS

| | | | |
|---|---|---|---|
| DE | 1 755 740 | A1 | 1/1972 |
| DE | 198 15 283 | C2 | 7/2000 |
| DE | 202 20 866 | U1 | 7/2004 |
| DE | 103 53 245 | A1 | 6/2005 |
| WO | 86/06036 | A1 | 10/1986 |
| WO | 03/068551 | A1 | 8/2003 |

* cited by examiner

*Primary Examiner* — Rodney B White

(74) *Attorney, Agent, or Firm* — Flaster/Greenberg PC

(57) ABSTRACT

Disclosed is an adjustment device for a motor vehicle seat having an adjusting element adjustably disposed in its longitudinal direction and in the area of one end, connectable in an articulated manner to a vehicle seat structure, and a drive unit driving the adjusting element. In order to provide an adjustment device of the initially named type, that can be disposed at a vehicle seat component in a simple and reliable manner, it is provided that the drive unit comprises means for the articulated, particularly pivotal, connection to a vehicle seat component, particularly a side member of a seat base frame.

14 Claims, 2 Drawing Sheets

ADJUSTABLE DEVICE FOR MOTOR VEHICLE SEAT

BACKGROUND OF THE INVENTION

1. Field of the Invention

Figure 1:
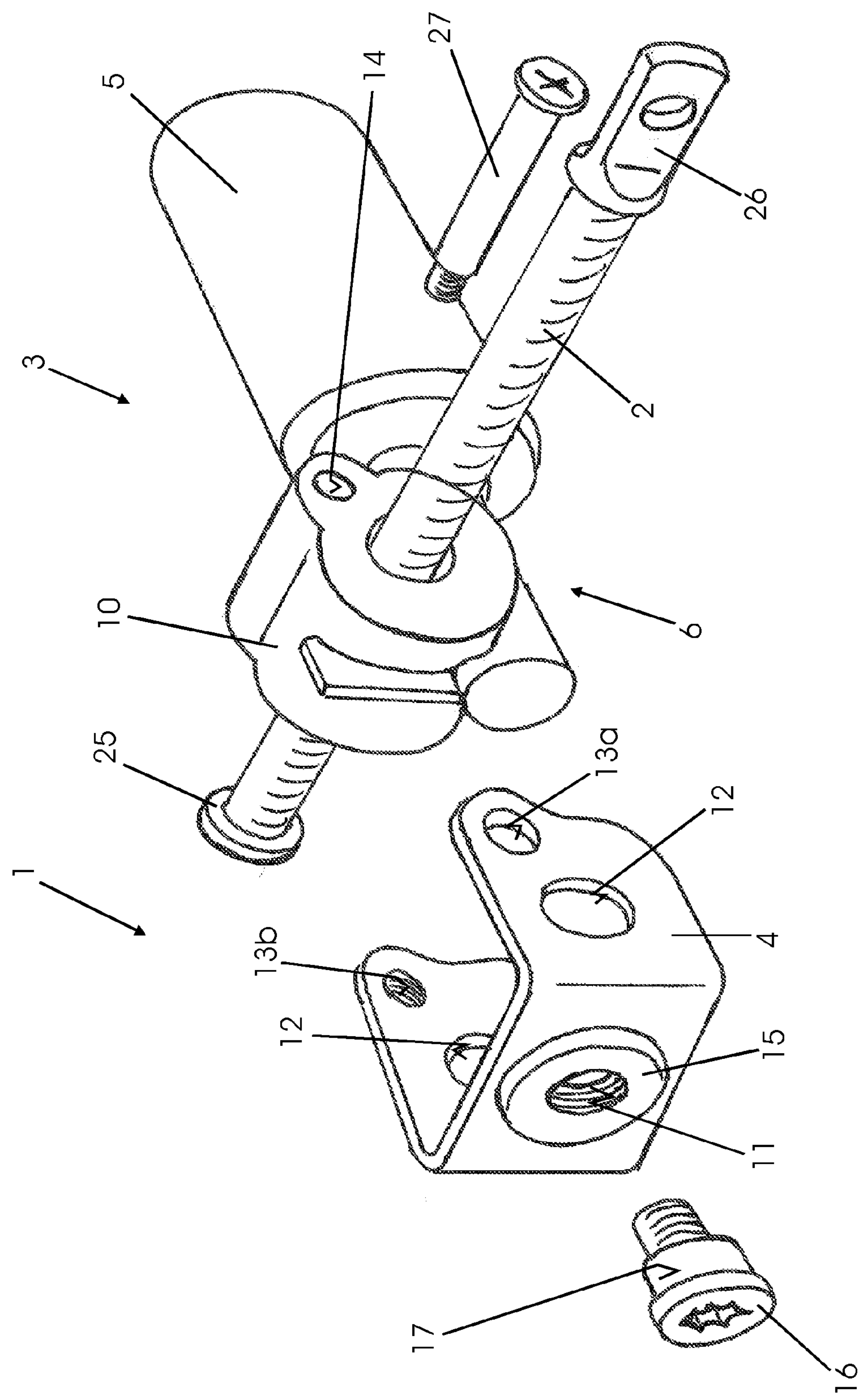

The invention relates to an adjustment device for a motor vehicle seat, having

- an adjusting element disposed adjustably in its longitudinal direction and in the area of one end connectable in an articulated manner to a vehicle seat structure, and
- a drive unit driving the adjusting element.

2. Description of Related Art

Adjustment devices of the generic type on motor vehicle seats enable easy adaptation of the seating position to the individual requirements of the respective user, in that they make the adjustment of the different adjustable seat structures possible, for instance, a seating surface or a seatback with respect to a vehicle floor. By means of an adjustment device connected to a seating surface, the option exists to adapt the height of the seating surface and also possibly its inclination, for example.

To allow an adjustment of the position of the vehicle seat structure by means of the adjustment device, it is necessary to position the adjustment device so that a displacement of the adjusting element of the adjustment device in its longitudinal direction created by the drive unit results in a displacement of the vehicle seat structure connected to the adjusting element. For this purpose, the adjustment device is preferably disposed at the motor vehicle seat itself, for example at a vehicle seat component, preferably at the seat base frame, for example at a side surface, in order to guarantee sufficient support for the adjusting element. The arrangement of the adjustment device in an articulated, particularly in a pivoting manner necessary for a trouble-free operation, often proved to be very complicated because high demands are placed on the fastening of the adjustment device for trouble-free and particularly noise-free operation.

BRIEF SUMMARY OF THE INVENTION

The object of the invention is to provide an adjustment device of the initially named type that can be disposed on a vehicle seat component in a simple and reliable manner. The object of the invention is further to provide a motor vehicle seat having an adjustment device that is easy to install and is highly reliable.

The object is solved by the invention by an adjustment device having the features of claim 1 and by a motor vehicle seat having the features of claim 14. Advantageous further developments of the invention are given in the dependent claims.

It is characteristic for the inventive adjustment device that the drive unit has a means for the articulated, particularly pivotal connection to a vehicle seat component, especially to a side member of a seat base frame. That means is adapted so that it guarantees an optimal arrangement of the adjustment device at the vehicle seat component, and also guarantees a secure connection to the drive unit. Through the use of a means adapted to the drive unit and the intended vehicle seat component, the adjustment device can be optimally fastened to the vehicle seat component. The possibility to design the means considering only the general conditions determined by the drive unit and the vehicle seat component guarantees a secure arrangement of the adjustment device at a vehicle seat component in a particularly reliable, cost-effective and simple manner. Thus, the means offers a simple possibility to mount the adjustment device at the vehicle seat component in the desired manner, without requiring extensive adaptation of the adjustment device or of the vehicle seat component for this purpose.

The design of the means can, in principle, be selected freely. Thus, it can also be formed integrally together with a housing of the drive unit, for example. According to a particularly advantageous design of the invention, however, the drive unit comprises a detachably connected retaining element, which is designed for the articulated, especially pivotal attachment at a vehicle seat component, especially a side member of a seat base frame. According to this further development of the invention the retaining element, which can be detachably connected to the drive unit, forms the means for the articulated, particularly pivotal connection of the adjustment device to the vehicle seat component. The use of such a retaining element makes it possible to design this element to be specific to vehicle seat components and drive units. Thus, by means of the design of the retaining element, for example, the possibility exists, using appropriately designed retaining elements, to dispose a standardized drive unit at various vehicle seat components without requiring extensive transformation measures of the adjustment device for this purpose. It is only necessary to adapt the vehicle seat side of the retaining element, but not the drive unit side. The retaining element forms an adapter which in principle enables cost-effective disposition of various adjustment devices at various motor vehicle seats. Also, it is in fact possible to connect different adjustment devices to a vehicle seat component solely by the use of suitable retaining elements such that overall the field of applications are particularly increased by the use of a detachably connected retaining element without this leading to significant increases in cost. Also, in the case of a possibly required exchange, the detachable connection of the retaining element to the drive unit enables a quick exchange of the adjustment device without extensive assembly work.

The design of the retaining element can in principle be freely selected, such that it can be connected to the vehicle seat component in an articulated manner. Thus, the retaining element can be provided with a pin or a bolt having a threaded section, for example, which extends through an opening at the vehicle seat component, and thereby makes it possible to attach the adjustment device. However, according to an advantageous design of the invention, the retaining element comprises a bore, especially threaded bore, for receiving a bearing bolt that can be disposed so as to rotate at a vehicle seat component. This design of the invention allows a particularly simple and cost-effective production of the retaining element, which for the articulated disposition must be provided only with the bore adapted to a bearing bolt. If necessary, the bore can also have a thread in order to allow a simple releasable fastening of the retaining element to the vehicle seat component, wherein, if necessary, the articulated connection is produced via mounting the bearing bolt with respect to the vehicle seat component.

As already stated at the beginning, it is essential for the function of the adjustment device that this is reliably fastened at the vehicle seat component in order to offer sufficient support of the adjusting element. At the same time, however, pivotability must be given so that a reliable positioning of the vehicle seat structure to be adjusted can be attained via the adjusting element, which is adjustable in its longitudinal direction, and thus, via a distance change of its first end to the adjustment device creating a position change of the vehicle seat structure to be adjusted. To increase the functional reliability, according to a further development of the invention the retaining element comprises a stop body that can be brought into contact with the vehicle seat component. The contact surface of the retaining element with the vehicle seat component can be determined by means of the stop body, so that malfunctions, for example a jamming of the adjustment device at the vehicle seat component, are prevented in a particular manner. Also, by means of the design of the stop body, a predetermined support of the adjustment device at the vehicle seat component can be attained. The arrangement of the stop body at the retaining element can in principle be selected freely, wherein the use of multiple stop bodies disposed at a distance to each other is also possible in order to attain good support in the case of simultaneous reduced contact surface.

According to a particularly advantageous design of the invention, the stop body is disposed, however, coaxially to the bore. A corresponding arrangement of the stop body in the area of the bores provided for the connection guarantees that the retaining element comes into contact with the stop body in the area at the vehicle seat component, via which the adjustment device abuts with the highest pressing forces at the vehicle seat component through the bearing bolt used. Distortion within the retaining element can be especially effectively avoided through this design of the invention.

The concrete design of the stop body can, as already stated above, in principle be selected freely, and can be designed corresponding to the respectively anticipated loads. Moreover, the possibility exists to form the stop body from a separate material and to connect it to the retaining element. According to a particularly advantageous design of the invention, the stop body is, however, formed integrally with the retaining element. In this design, through suitable production methods the retaining element is formed in an area such that in the mounted state it comprises a defined stop surface with the vehicle seat component. According to this further development of the invention, time and cost intensive fastening methods for disposing a separate stop body can be avoided so that the adjustment device can be produced particularly cost-effectively. For the supplemental improvement of the functional reliability, according to a further development of the invention, the stop body can have a slide coating by means of which the friction existing during operation between the vehicle seat component and the stop body can additionally be minimized, and thus, wear can be prevented.

The concrete design of the retaining element such that this is connected to the drive unit and makes possible an attachment of the adjustment device to a vehicle seat component, can be freely selected corresponding to the constructive specifications due to the drive unit and due to the vehicle seat component. However, according to a particularly advantageous design of the invention, the retaining element is constructed such that it encompasses the drive unit at least partially in a U-shape manner. This design of the invention guarantees that the retaining element experiences good support at the drive unit so that the adjustment device has a particularly high functional reliability. The connection between the retaining element and the drive unit occurs here preferably via the free limbs of the U-shaped retaining element so that the latter is secured in a particularly reliable manner in its position at the drive unit. A connecting bolt extends, particularly advantageously, through suitable openings in the free limbs of the U-shaped retaining element, and also through the drive unit.

A displaceability of the adjusting element in its longitudinal direction by the drive unit is essential for the function of the adjustment device in order to achieve an adjustment of a vehicle seat structure connected to the adjusting element. A free axial shiftability of the adjusting element is therefore essential for the function of the adjusting device disposed at a vehicle seat component. According to a particularly advantageous design of the invention, the retaining element comprises a through opening for receiving the adjusting element in a displaceable manner. This design of the retaining element allows, in connection with the drive unit, a particularly compact design and furthermore permits, if necessary, the use of the retaining element for supporting the adjusting element, wherein for this purpose the through openings are designed correspondingly with appropriate bearing bolts, for example. In its simplest design, however, the through openings are constructed so that they only permit a free shiftability of the adjusting element with respect to the retaining element.

The fundamental alignment of the support axes and movement axes can be selected freely. However, according to a particularly advantageous design of the invention, the bore for receiving the bearing bolt and the adjusting element are disposed so that their longitudinal axes progress essentially at right angles to each other and in a common plane. Through this design of the invention, damaging transverse forces and torques acting on the adjusting element are substantially avoided so that the functional reliability can be additionally increased. In addition, this design of the invention is characterized by a particularly compact construction.

The design of the drive unit, such that it causes a shift of the adjusting element, in principle can be freely selectable. Thus, a hydraulic or pneumatic drive unit, for example, can be used which offers the possibility of longitudinal shifting of the adjusting element. The use of a piston-cylinder unit or similar is conceivable, wherein an adjustment of the connected vehicle seat structure is possible via the position of the piston with respect to the cylinder. However, according to a particularly advantageous design of the invention, the drive unit comprises a motor unit and a transmission unit, wherein the adjusting element is in engagement with the transmission unit. According to this design of the invention, wherein the motor unit is formed preferably by an electric motor drive, a particularly simple, cost-effective and reliable adjustment device can be constructed. The use of a transmission unit enables on the one hand a relatively free arrangement of the drive unit with respect to the adjusting element and on the other hand, if desired, a transmission of the drive moment which is provided by the drive unit.

According to a particularly advantageous design of the invention, the motor unit is coupled via a worm disposed on an output shaft to a worm gear mounted so as to rotate in a transmission housing, wherein the worm gear is constructed as a spindle nut to drive a spindle disposed axially in the worm gear. This design of the invention is characterized by its particularly compact construction, wherein simultaneously reliable adjustment of the adjusting element formed as a spindle is guaranteed. Furthermore, the spindle is characterized by its suitability, according to a further development of the invention, to be designed self-locking so that, if necessary, no further measures are necessary for securing the position of the vehicle seat structure adjusted by the adjustment device.

The design of the spindle is in principle freely selectable, wherein the previously described design that it is self-locking, enables simple securing of the position of the adjusted location of vehicle seat structure to be adjusted. Furthermore, according to a particularly advantageous design of the invention, the spindle at the first end comprises a connecting link for articulated connection to a lever and a stop element at its second end, opposite to the first end. The connecting link permits a particularly simple attachment to the vehicle seat structure to be adjusted, and the stop element guarantees that the spindle in each case remains in engagement with the transmission unit. In this respect, the functional reliability of the adjustment device according to the invention can be additionally increased.

The motor vehicle seat according to the invention, having a seat base frame and an adjustable assembly with respect to the seat base frame, is characterized in that an articulated, in particular pivotal, adjustment device according to one or more of the claims 1 to 13 is disposed at the seat base frame, in particular at a side member. A correspondingly designed motor vehicle seat can be disposed in a particularly simple and cost-effective manner, wherein the use of a retaining element permits a good adaptation of the adjustment device to be used to the motor vehicle seat, wherein furthermore, due to the retaining element a plurality of different adjustment devices can be disposed at the seat base frame, and thereby allow an optimal design of the motor vehicle seat.

Particularly advantageously, the adjustment device is connected to the adjustment device in an articulated manner via a bearing bushing disposed at a seat base frame, whereby the functional reliability of the motor vehicle seat can be increased additionally, and malfunctions are excluded to the greatest extent possible.

BRIEF DESCRIPTION OF THE SEVERAL VIEWS OF THE DRAWING(S)

Figures 2, 3:
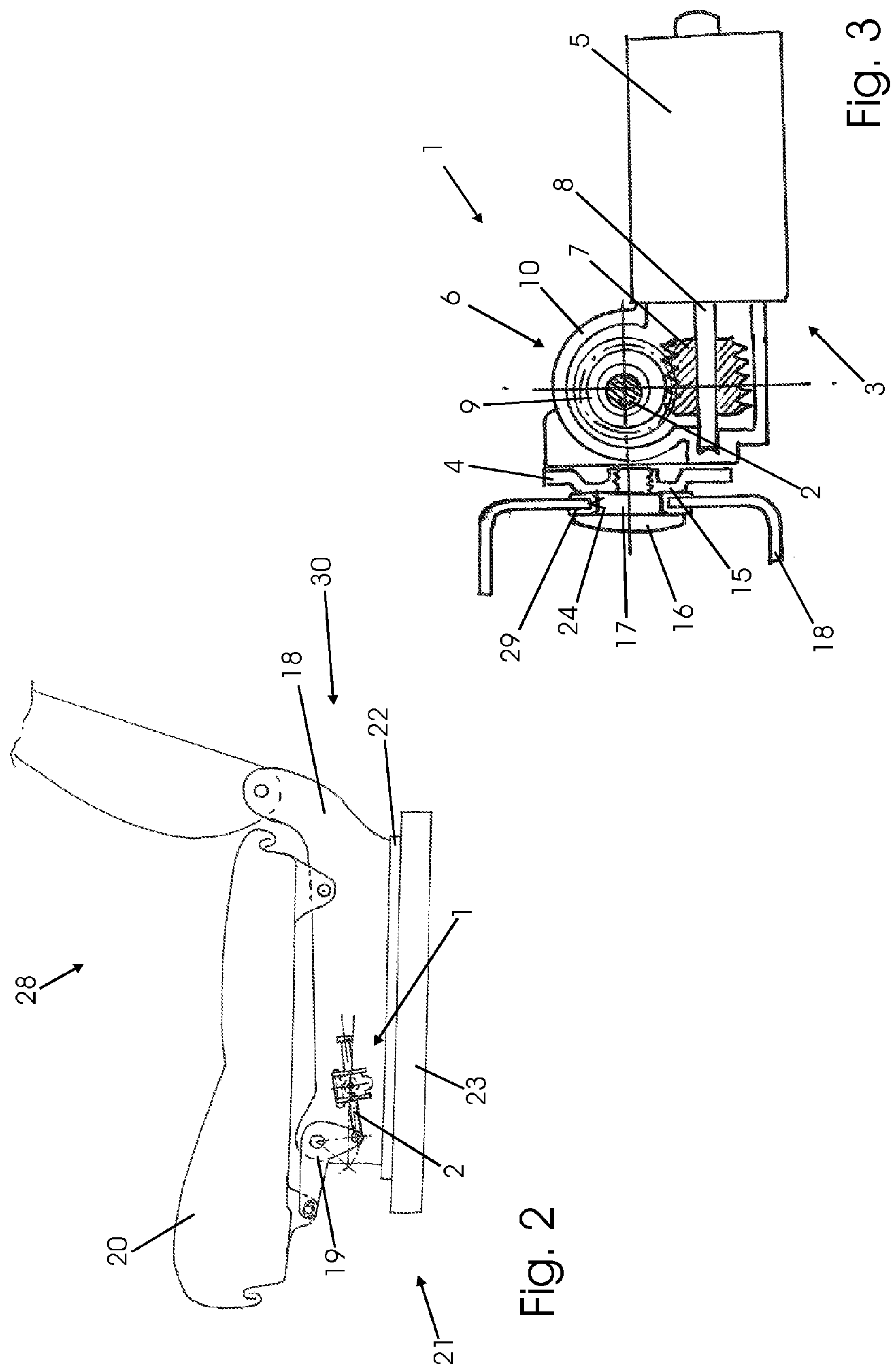

An exemplary embodiment of the invention is explained in the following in more detail with reference to the drawings. The drawings show:

FIG. 1 a perspective view of an adjustment device in a partially disassembled state, FIG. 2 a side view of a portion of a motor vehicle seat having an adjustment device disposed at a side surface of a seat base frame, and FIG. 3 a view of the adjustment device from FIG. 1 in an assembled state on a side member, partially represented in section.

DETAILED DESCRIPTION OF THE INVENTION

The adjustment device 1 represented in FIG. 1 comprises a drive unit 3 and a retaining element 4, detachably connected to the drive unit 3, by means of which the adjustment device 1 is fastened to a vehicle seat component, here at a side member 18 of a seat base frame 30, as shown in FIGS. 2 and 3. The drive unit 3 of the adjustment device 1 comprises a motor unit 5 and a transmission unit 6 connected to the motor unit 5, wherein an adjusting element constructed as a spindle 2 can be adjusted in its longitudinal direction at the transmission unit 6.

For transmitting a rotational movement of an output shaft 8 of the motor unit 5 to the spindle 2, the transmission unit 6 comprises a worm gear 9, disposed so as to rotate in a transmission housing 10, that on the outside engages with a worm 7 disposed on an output shaft 8 of the motor unit 5, so that rotational movements of the output shaft 8 are converted into a rotational movement of the worm gear 9. The worm gear 9 is constructed as a spindle nut for driving the spindle 2, so that rotational movements of the worm gear 9 in a longitudinal direction guide the spindle 2 disposed axially at the worm gear 9. The adjustment device of the spindle 2 is dependent on the rotational direction of the output shaft 8.

The spindle 2 itself comprises a connecting link 26 at a first end with which it is connected in an articulated manner to a vehicle seat structure 20 to be adjusted, wherein security against rotating the spindle 2 is also created by means of the produced connection. At its end opposite to the first end, the spindle 2 further comprises a stop element 25, which limits the longitudinal motion of the spindle 2.

The connection of the spindle 2 via the connecting link 26 to a vehicle seat structure 20 to be adjusted can in principle occur in any manner. However, in the example embodiment shown in FIG. 2, the spindle 2 is connected via the connecting link 26 to a lever 19 which is disposed so as to rotate at a side member 18 of a seat base frame 30, wherein the lever 19 in turn at its end opposite the spindle 2 is connected in an articulated manner to a seating surface 20, so that an adjustment of this vehicle seat structure is possible due to the adjustment device 1.

In the present exemplary embodiment, the side surface 18 of the seat base frame 30 is connected to an upper rail 22 of a rail pair 21, wherein the slidability of the upper rail 22 with respect to a lower rail 23 allows a longitudinal adjustability of the motor vehicle seat 28. Neither the arrangement of the adjustment device 1 at a side surface 18, nor the arrangement of a side surface 18 at an upper rail 23 is mandatory. Thus, the side member 18 can also be a component of the seat base frame 30 in another manner, or the adjustment device 1 can be disposed at another location.

A retaining element 4 that is a component of the adjustment device 1, serves for the arrangement of the drive unit 3, composed of the motor unit 5, transmission unit 6 and the adjusting element 2, at the side surface 18 of the seat base frame 30. The retaining element 4 comprises a U-shaped form, wherein the distance between the free limbs of the retaining element 4 is selected so that the retaining element 4 encompasses the transmission housing 10. Through openings 12 disposed in the free limbs permit the passage of the spindle 2 through the retaining element 4. Fastening openings 13*a*, 13*b* also disposed in the free limbs, permit the retaining element 4 to be fastened to the transmission housing 10, for which a fastening screw 27 extends through both the fastening openings 13*a*, 13*b* as well as through a through bore 14 in the transmission housing 10 so that the retaining element 4 is detachably disposed at the transmission housing 10.

On the outside at its base area facing the side member 18, the retaining element 4 comprises a threaded bore 11 coaxially to which a projecting stop body 15 is disposed that in the assembled state abuts at the side surface 18 of the seat base frame 30. A bearing bolt 16, serving for the pivotal connection of the adjustment device 1, can be screwed to an end-side threaded section in the threaded bore 11, and with a bearing section 17 is disposed in the assembled state in the area of an opening 24 of the side surface 18, wherein for improving the pivotal mounting a bearing bushing 29 is installed in the opening 24. This arrangement of the adjustment device 1 using the retaining element 4 guarantees a particularly trouble-free operation in the case of an adjustment of the seating surface 20 with respect to the seat base frame 30.

I claim:

1. An adjustment device for a motor vehicle seat, having an adjusting element adjustably disposed in its longitudinal direction and in the area of one end, connectable in an articulated manner to a vehicle seat structure, and a drive unit driving the adjusting element, comprising a detachably connected retaining element for pivotal connection of the drive unit to a vehicle seat component, wherein the retaining element comprises a through opening for receiving the adjusting element in a displaceable manner.

2. The adjustment device according to claim 1, wherein the retaining element comprises a bore, in particular a threaded bore for receiving a bearing bolt that can be disposed so as to rotate at a vehicle seat component.

3. The adjustment device according to claim 2, wherein the bore and the adjusting element are disposed so that their longitudinal axes run essentially at right angles to each other and in a common plane.

4. The adjustment device according to claim 1, wherein the retaining element comprises a stop body that can be brought into contact with the vehicle seat component.

5. The adjustment device according to claim 4, wherein the stop body is disposed coaxially to the bore.

6. The adjustment device according to claim 4, wherein the stop body is formed integrally with the retaining element.

7. The adjustment device according to claim 4, wherein the stop body comprises a slide coating.

8. The adjustment device according to claim 1, wherein the retaining element is constructed such that it encompasses the drive unit at least partially in a U-shape.

9. The adjustment device according to claim 1, wherein the drive unit comprises a motor unit and a transmission unit, wherein the adjusting element is in engagement with the transmission unit.

10. The adjustment device according to claim 9, wherein the motor unit is coupled via a worm disposed on an output shaft to a worm gear mounted so as to rotate in a transmission housing, wherein the worm gear is constructed as a spindle nut for driving a spindle disposed axially in the worm gear.

11. The adjustment device according to claim 10, wherein the spindle comprises a connecting link at the first end for the articulated connection to a lever, and a stop element at its second end opposite to the first end.

12. A motor vehicle seat having a seat base frame and an assembly adjustable with respect to the seat base frame, wherein the adjustment device according to claim 1 is disposed in a pivotal manner at the seat base frame.

13. The motor vehicle seat according to claim 12, wherein the adjustment device is mounted in an articulated manner via a bearing bushing disposed in an opening of the vehicle seat component.

14. The motor vehicle seat according to claim 13, wherein the vehicle seat component is a side member.

* * * * *